2,747,672
Patented May 29, 1956

2,747,672
METHOD OF HEATING SUBTERRANEAN FORMATIONS

Clarke N. Simm, Fullerton, Calif., assignor to California Research Corporation, San Francisco, Calif., a corporation of Delaware No Drawing. Application September 11, 1953, Serial No. 379,723

7 Claims. (Cl. 166—38)

This invention relates to methods of generating heat in subterranean formations penetrated by a well bore. In the production of petroleum there are a number of applications in which it is desirable to supply a considerable amount of heat to a subterranean formation containing petroliferous deposits. Such heat may be required, for example, to ignite a portion of the petroliferous deposit for secondary recovery by in situ combustion, or to lower the viscosity of the deposit to improve the pumpability thereof, or to consolidate loose or incompetent formations by high-temperature glazing or firing of the formation particles.

Heretofore, numerous methods and devices, such as electric heaters and gas-air burners, have been proposed for creating a high temperature in a well bore. However, devices of this nature have the disadvantage of requiring piping or wiring extending from the earth's surface to the desired area of application of the heat, and this amount of piping or wiring is prohibitively large and difficult to accurately control in the case of heating of formations a considerable distance below the earth's surface. Such devices have the additional disadvantage that, in cases where it is desired to simultaneously heat a considerable length of the formation, the required size of such a device becomes excessive.

I have discovered a method of creating a high temperature in a subterranean formation which does not have the above disadvantages and which is simple and economical. Briefly, the present invention may be said to comprise the steps of introducing a substance containing elemental phosphorus into a well bore penetrating the formation to be heated and introducing into the well bore in contact with the phosphorus a substance capable of initiating an exothermic reaction with the phosphorus.

I prefer to use phosphorus because of its high heat content per unit weight and because it is inert to both oil and water.

In one form of the invention a dispersion in the form of a solution of elemental phosphorus in carbon disulfide is used. This solution is injected into the well bore and pressure applied thereto to impregnate the formation to be heated with the solution. After such impregnation, a substance capable of reacting with the phosphorus to produce heat is introduced into the well bore. Such substance may be and preferably is air or a mixture of air and a combustible gas. The introduction of the gaseous substance will evaporate the carbon disulfide to expose the phosphorus to the incoming gaseous substance. This exposure ignites the phosphorus to heat the impregnated formation and, where a mixture of air and a combustible gas is used, the mixture is ignited by the burning phosphorus to produce additional heat.

In an additional form of practicing the invention, the dispersion of phosphorus is in the form of a suspension of phosphorus in either water or in oil. This suspension is introduced into the formation in a manner similar to that described above, to impregnate the formation or coat the well bore walls. A gaseous substance is then introduced as before to displace the suspending fluid and to produce oxidation of the phosphorus for generating heat.

The use of a solution permits easier and more thorough penetration of the phosphorus into the formation than with the use of a suspension. The use of the suspension has the advantages of requiring less phosphorus to obtain the same amount of heating of the face of the well bore than is required with a solution of phosphorus and carbon disulfide, and the suspending fluids which may be utilized in a suspension are more economical than carbon disulfide.

In an experimental investigation of the effectiveness of the method of this invention, an oil containing formation was impregnated with phosphorus and the phosphorus therein ignited. The formation had a length of one foot and was penetrated by a four-inch diameter hole. This one-foot length of formation was impregnated with a solution comprising one pound of phosphorus in 200 cc. of carbon disulfide. Air was then introduced into the well bore to evaporate the carbon disulfide and to produce oxidation of the phosphorus. The temperature of the formation during oxidation ranged from 1500° F. to 1800° F. and the oil-bearing sand therein was ignited directly from the heat released by the phosphorus. In another test, the above formation was impregnated with a solution comprising one pound of phosphorus and 200 cubic centimeters of carbon disulfide as before. A combustible mixture of air and liquefied petroleum gas was then injected into the well bore to evaporate the carbon disulfide and ignite the phosphorus. Ignition of the phosphorus produced ignition of the mixture of air and LPG to produce heat in addition to the heat provided by the ignition of the phosphorus. The burning of the gas-air mixture occurred in the annular volume of formation immediately adjacent to the injection well bore so that the formation itself served the function of a gas-air burner. In another test on the effectivenes of the method of this invention in starting in situ combustion, one half pound of phosphorus was suspended in 100 cubic centimeters of crude oil and this suspension was introduced in the same oil bearing formation as describde above. Air was then introduced into the well bore to displace the suspending crude oil and ignite the phosphorus. The ignition of the phosphorus produced a temperature of 850° F. in the portion of the oil-bearing formation immediately surrounding the well bore. However, this temperature was insufficient to maintain thermally stable combustion in the formation oil, and therefore, an additional one-half pound of phosphorus was injected into the well bore and ignited. The formation temperature thereupon increased to 1700° F. and thermally stable combustion of the formation oil was established.

Although but a few embodiments of the present invention have been illustrated and described, it will be apparent to those skilled in the art that various changes and modifications may be made therein without departing from the spirit of the invention or the scope of the appended claims.

I claim:

1. The method of heating a subterranean formation penetrated by a well bore comprising the steps of introducing into said well bore a dispersion of phosphorus in a substance to which said phosphorus is inert, applying pressure to said dispersion to impregnate the wall of said well bore with said phosphorus, and introducing into said well bore in contact with said phosphorus an oxygen-containing gas capable of initiating exothermic reaction with said phosphorus.

2. The method of heating a subterranean formation penetrated by a well bore comprising the steps of introducing into said well bore a dispersion of phosphorus in a substance to which said phosphorus is inert, applying pressure to said dispersion to impregnate the wall of said well bore with said phosphorus, and introducing into said well bore in contact with said phosphorus an oxygen-containing gas for igniting said phosphorus to heat said formation.

3. The method in accordance with claim 2 wherein said dispersion is a solution of phosphorus in carbon disulfide.

4. The method in accordance with claim 2 wherein said dispersion is a suspension of phosphorus in water.

5. The method in accordance with claim 2 wherein said dispersion is a suspension of phosphorus in oil.

6. The method of heating a subterranean formation penetrated by a well bore comprising the steps of introducing into said well bore a dispersion of phosphorus in a fluid to which said phosphorus is inert, applying pressure to said dispersion to impregnate the walls of said well bore with said phosphorus, and introducing into said well bore in contact with said phosphorus an oxygen-containing gaseous combustible mixture capable of producing an exothermic reaction with said phosphorus, whereby said combustible mixture is ignited by the heat produced by said reaction.

7. The method in accordance with claim 6 wherein said dispersion is a solution of elemental phosphorus in carbon disulfide.

References Cited in the file of this patent

UNITED STATES PATENTS

| | | |
|---|---|---|
| 797,529 | Oliphant et al. | Aug. 15, 1905 |
| 1,858,456 | Mills | May 17, 1932 |
| 2,558,726 | Barker | July 3, 1951 |
| 2,630,307 | Martin | Mar. 3, 1953 |
| 2,695,223 | Bartleson | Nov. 23, 1954 |

OTHER REFERENCES

Hackh's Chemical Dictionary, 3rd Edition, Copyright 1944, page 649.